US011198150B2

(12) United States Patent
Itoh et al.

(10) Patent No.: US 11,198,150 B2
(45) Date of Patent: Dec. 14, 2021

(54) MULTI-LAYERED COATING FILM AND METHOD FOR FORMING MULTI-LAYERED COATING FILM

(71) Applicant: KANSAI PAINT CO., LTD., Hyogo (JP)

(72) Inventors: Masayuki Itoh, Kanagawa (JP); Nobuhiko Narita, Kanagawa (JP); Tatsuo Kuramochi, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 101 days.

(21) Appl. No.: 16/074,547

(22) PCT Filed: Feb. 3, 2017

(86) PCT No.: PCT/JP2017/004026
§ 371 (c)(1),
(2) Date: Aug. 1, 2018

(87) PCT Pub. No.: WO2017/135426
PCT Pub. Date: Aug. 10, 2017

(65) Prior Publication Data
US 2019/0001370 A1 Jan. 3, 2019

(30) Foreign Application Priority Data
Feb. 5, 2016 (JP) .............. JP2016-021017

(51) Int. Cl.
*B05D 1/36* (2006.01)
*C09D 5/29* (2006.01)
*C09D 201/00* (2006.01)
*B05D 3/02* (2006.01)
*B32B 7/02* (2019.01)
*C09D 7/40* (2018.01)
*B05D 5/06* (2006.01)
*C09D 167/02* (2006.01)
*C09D 175/04* (2006.01)
*B05D 1/04* (2006.01)
*B05D 7/00* (2006.01)
*B05D 3/10* (2006.01)

(52) U.S. Cl.
CPC ............ *B05D 1/36* (2013.01); *B05D 1/04* (2013.01); *B05D 3/0254* (2013.01); *B05D 5/068* (2013.01); *B05D 7/572* (2013.01); *B32B 7/02* (2013.01); *C09D 5/29* (2013.01); *C09D 7/70* (2018.01); *C09D 167/02* (2013.01); *C09D 175/04* (2013.01); *C09D 201/00* (2013.01); *B05D 3/102* (2013.01); *B05D 2401/20* (2013.01); *B05D 2502/00* (2013.01); *B05D 2503/00* (2013.01); *B05D 2508/00* (2013.01); *B05D 2601/08* (2013.01)

(58) Field of Classification Search
CPC ......... B05D 1/36; B05D 3/0254; B05D 1/04; B05D 5/068; B05D 7/572; B05D 2601/08; B05D 2502/00; B05D 2503/00; B05D 2508/00; B05D 2401/20; B05D 3/102; C09D 201/00; C09D 7/70; C09D 167/02; C09D 175/04; C09D 5/29; B32B 7/02
See application file for complete search history.

(56) References Cited

U.S. PATENT DOCUMENTS

| 2007/0104874 | A1* | 5/2007 | Ogawa | B05D 7/542 427/372.2 |
| 2007/0128369 | A1* | 6/2007 | Fujieda | B05D 5/061 427/384 |
| 2009/0136729 | A1 | 5/2009 | Tonomura et al. | |
| 2015/0210867 | A1* | 7/2015 | Fujiwara | B05D 7/57 428/328 |

FOREIGN PATENT DOCUMENTS

| EP | 1 810 757 | 7/2007 |
| JP | 2003-245603 | 9/2003 |
| JP | 2004-8931 | 1/2004 |
| JP | 2005-152841 | 6/2005 |
| JP | 2006-87978 | 4/2006 |
| JP | 2009-183885 | 8/2009 |
| JP | 2011-45805 | 3/2011 |
| JP | 2012-157827 | 8/2012 |
| JP | 2013-23562 | 2/2013 |

OTHER PUBLICATIONS

Translation to English JP2006087978 via espacenet. accessed Jun. 5, 2020. (Year: 2006).*
Extended European Search Report dated Aug. 22, 2019 in corresponding European Patent Application No. 17747577.9.
International Search Report dated May 16, 2017 in International (PCT) Application No. PCT/JP2017/004026.

* cited by examiner

*Primary Examiner* — Nancy R Johnson
(74) *Attorney, Agent, or Firm* — Wenderoth, Lind & Ponack, L.L.P.

(57) ABSTRACT

This invention relates to a multilayer coating film sequentially comprising, on a substrate, a colored coating film, an effect coating film, and a clear coating film, wherein the multilayer coating film has a lightness $L^*110$ within a range of 60 to 90, the lightness $L^*110$ being based on a spectral reflectance of light illuminated at an angle of 45 degrees with respect to the coating surface and received at an angle of 110 degrees with respect to the specularly reflected light; a 60-degree specular gloss within a range of 105 to 180, a graininess HG within a range of 10 to 40; and a flip-flop value within a range of 1.0 to 1.8.

9 Claims, No Drawings

MULTI-LAYERED COATING FILM AND METHOD FOR FORMING MULTI-LAYERED COATING FILM

CROSS REFERENCE TO RELATED APPLICATION

This application claims priority to Japanese Patent Application No. 2016-021017 filed on Feb. 5, 2016, the entire contents of which are incorporated herein by reference.

TECHNICAL FIELD

The present invention relates to a multilayer coating film and a method for forming a multilayer coating film.

BACKGROUND ART

The purpose of applying coating compositions is mainly to protect materials and impart an excellent appearance. For industrial products, an excellent appearance, particularly "texture," is important in terms of enhancing their product power. Although there are various textures for industrial products desired by consumers, luster like metal or pearl (hereinafter referred to as "metallic luster") has recently been desired in the field of automobile exterior panels, automobile components, home electronics, and the like.

Metallic luster represents a texture with no graininess on the surface, like a mirror-finished surface, and the coated plate looks shiny when viewed nearly perpendicular to the coated plate (highlight). Of such texture, white metallic texture has been in demand in which the highlight region has a high lightness while the region at which the coating film is obliquely viewed (shade) has a lower lightness than that of the highlight region but has a perceivable white color.

Patent Literature (PTL) 1 discloses a method for forming a laminated coating film, the method achieving the metallic appearance of a metal-plated surface, without a plating treatment. Specifically, PTL 1 discloses a method for forming a laminated coating film exhibiting a metallic appearance, the method comprising applying, to a substrate, a metallic coating composition containing an opaque scale-like pigment and an effect pigment obtained by crushing a vapor-deposited metal film into metal pieces, and applying a clear top coating composition to the formed metallic coating layer. In PTL 1, the concentrations of the scale-like pigment and effect pigment are increased in the metallic coating composition so that the scale-like pigment and the effect pigment are oriented in parallel to the coating surface to thus form a metallic coating film; however, the lightness greatly changes from the highlight to the shade, and the shade becomes black, making it impossible to obtain a white metallic coating film.

PTL 2 discloses a method for forming an effect coating film, the method being capable of obtaining a coating film that can achieve clear whiteness and has no darkened color when the coating film is obliquely viewed (shade portion) while avoiding a reduction in the brightness of the aluminum flake pigment. This method comprises forming, on a substrate, an effect base coating film containing an aluminum flake pigment having a specific shape, and forming a first clear coating, film containing organic resin fine particles on the effect base coating film, and further forming a second clear coating film on the first clear coating film. Lamination of the coating film containing organic resin fine particles on the effect coating film containing the aluminum flake pigment makes it possible to obtain an effect coating film that achieves clear whiteness and has no darkened color when the coating film is obliquely viewed (shade portion); however, the incident light scatters due to the organic resin fine particles, and the brightness of the effect coating film is undesirably deteriorated.

PTL 3 discloses a method for forming a coating film, the method being capable of forming a calming coating film that has high whiteness, a delicate appearance, and a small lightness change from the highlight (in the vicinity of specularly reflected light) to the shade (in an oblique direction). This method for forming a coating film comprises sequentially forming a color base coating film having a lightness L* in the L*a*b* color space within the range of 75 to 90, a metallic base coating film containing four types of optical interference pigments having different interference colors in the highlight, and a top clear coating film. The presence of multiple types of optical interference pigments having different interference colors makes it possible to obtain a delicate white pearl coating color; however, the use of optical interference flakes results in insufficient brightness in the highlight and a greater lightness change from the highlight to the face, making it impossible to obtain the white metallic coating film mentioned above.

CITATION LIST

Patent Literature

PTL 1: JP2004-8931A
PTL 2: JP2003-245603A
PTL 3: JP2011-45805A

SUMMARY OF INVENTION

Technical Problem

An object of the present invention is to provide a white metallic multilayer coating film having high gloss at the highlight, a high lightness throughout the film from the highlight to the shade, and excellent water resistance, and also to provide a method for forming a multilayer coating film.

Solution to Problem

The first embodiment of the present invention provides a multilayer coating film sequentially comprising, on a substrate, a colored coating film, an effect coating film, and a clear coating film, wherein the multilayer coating film has a lightness $L^*110$ within the range of 60 to 90, the lightness $L^*110$ being based on a spectral reflectance of light illuminated at an angle of 45 degrees with respect to the coating surface and received at an angle of 110 degrees with respect to the specularly reflected light, a 60-degree specular gloss within the range of 105 to 180, a graininess HG within the range of 10 to 40, and a flip-flop value within the range of 1.0 to 1.8.

The second embodiment of the present invention provides a method for forming a multilayer coating film, the method comprising applying a colored coating composition (X) to a substrate to form a colored coating film, applying an effect pigment dispersion (Y) to the uncured colored coating film to form an effect coating film, applying a clear coating composition to the uncured effect coating film to form an uncured clear coating film, and heating the uncured colored coating film, the uncured effect coating film, and the uncured clear coating film to simultaneously cure these three coating films. The formed multilayer coating film has a lightness L*110 within the range of 60 to 90, the lightness L*110 being based on a spectral reflectance of light illuminated at an angle of 45 degrees with respect to the coating surface and received at an angle of 110 degrees with respect to the specularly reflected light, a 60-degree specular gloss within the range of 105 to 180, a graininess HG within the range of 10 to 40, and a flip-flop value within the range of 1.0 to 1.8.

Advantageous Effects of Invention

According to the present invention, a white metallic coating film having high gloss at the highlight, a high lightness throughout the film from the highlight to the shade, and excellent water resistance is obtained.

DESCRIPTION OF EMBODIMENTS

The multilayer coating film according to the present invention comprises a colored coating film, an effect coating film, and a clear coating film sequentially formed on a substrate, and has a white metallic texture with a high lightness throughout the film from the highlight to the shade. The multilayer coating film according to the present invention can be obtained by applying a colored coating composition (X) to a substrate to form a colored coating film, applying an effect pigment dispersion (Y) described below to the colored coating film to form an effect coating film, and further applying a clear coating composition (Z) to form a clear coating film. More specifically, the coating film has the lightness L*110 in the shade region, specular gloss, graininess, and flip-flop value within the following numerical ranges.

Lightness in the Shade Region

In this specification, a lightness L*110 in the shade region specifically refers to a lightness L* in the L*a*b* color space calculated based on a spectral reflectance of light illuminated at an angle of 45 degrees with respect to the coating film and received at an angle of 110 degrees with respect to the specularly reflected light. The multilayer coating film obtained by the method for forming a multilayer coating film according to the present invention has a lightness L*110 within the range of 60 to 90.

Specular Gloss (60° Gloss)

Specular gloss refers to a ratio of specular reflection from an object surface and specular reflection light from a reference plane (glass with a refractive index of 1.567), and is a numerical value defined by JIS-Z8741. Specifically, specular gloss is determined in the following manner: luminous flux at a specific aperture angle is made incident at a specific incidence angle on a measurement sample plain, and the luminous flux at a specific aperture angle reflected in the specular reflection direction is measured with a photo detector; i.e., specular gloss is a numerical value measured with a gloss meter. As used herein, specular gloss is defined as 60-degree specular gloss (60° gloss) measured using a gloss meter (micro-TRI-gloss, produced by BYK-Gardner). The multilayer coating film according to the present invention has a 60° gloss value within the range of 105 to 180.

Graininess

Graininess is expressed as a hi-light graininess value (hereinafter abbreviated as the "HG value"). The HG value is a parameter of micro-brilliance, which is a texture obtained by microscopic observation, and indicates the graininess in the highlight (when the coating film is observed from near specular reflection with respect to the incident light). The HG value is obtained by taking an image of the coating film at an incident angle of 15° and a receiving angle of 0° using a CCD camera; subjecting the obtained digital image data, i.e., two-dimensional lightness distribution data, to Fourier transformation; extracting only the spatial frequency domain corresponding to graininess from the obtained power spectrum image; and converting the obtained measurement parameter into a numeric value in the range of 0 to 100 in such a manner that the numeric value is directly proportional to the graininess. Specifically, the HG value can be measured using micro brilliance-measuring devices. The details of the measurement method are found on page 8 to 24 of Research on Coatings (Kansai Paint Technical Report), No. 138, August 2002, and on pages 8 to 24 of Research on Coatings (Kansai Paint Technical Report), No. 132, August 2002. The multilayer coating film according to the present invention has an HG value within the range of 10 to 40.

Flip-Flop (FF) Value

The flip-flop (FF) value is a numerical value representing the magnitude of a lightness change according to the observation angle. Specifically, spectral reflectances are measured at receiving angles of 15 and 45 degrees with respect to the specular reflection light of light illuminated at an angle of 45 degrees with respect to the coating film using an MA-681I multi-angle spectrophotometer (trade name, produced by Videojet X-Rite K.K.), and Y values (i.e., Y15 and Y45) in the XYZ color space are calculated based on the measured spectral reflectances. A numerical value calculated using the following formula is defined as the FF value.

Flip-flop value (FF value)=$2 \times (Y15-Y45)/(Y15+Y45)$

The FF value of the multilayer coating film according to the present invention is within the range of 1.0 to 1.8.

Substrate

The multilayer coating film according to the present invention is formed on the following substrates Examples of the substrate include metals, such as iron, zinc, and aluminum; metal materials, such as alloys containing these metals; molded products of these metals; molded products of glass, plastic, foam, and the like. Degreasing treatment or surface treatment can be suitably performed depending on these materials to obtain substrates. Examples of the surface treatment include phosphate treatment, chromate treatment, composite oxide treatment, and the like. Furthermore, when the material of the substrate is metal, it is preferable that an undercoating film is formed on a surface-treated metal material using a cationic electrodeposition coating composition or the like. Moreover, when the material of the substrate is plastic, it is preferable that a primer coating film is formed on a degreased plastic material using a primer coating composition.

Colored Coating Composition (X)

As the colored coating composition (X), a known thermosetting coating composition comprising a vehicle-forming resin, a pigment, and a solvent, such as an organic solvent and/or water, as main components can be specifically used. Examples of the thermosetting coating composition include intermediate coating compositions, base coating compositions, and the like.

Examples of the vehicle-forming resin used in the colored coating composition (X) include thermosetting resins, room-temperature-curable resins, and the like. However, in terms of water resistance, chemical resistance, weather resistance, and the like, thermosetting resins are preferably used. It is preferable to use the vehicle-forming resin in combination with a base resin and a crosslinking agent.

The base resin is preferably a resin that has excellent weather resistance, transparency, and the like. Specific examples include acrylic resins, polyester resins, epoxy resins, urethane resins, and the like.

Examples of acrylic resins include resins obtained by copolymerizing α,β-ethylenically unsaturated carboxylic acids, (meth)acrylic acid esters having a functional group, such as a hydroxyl group, an amide group, or a methylol group, other (meth)acrylic-acid esters, styrene, and the like.

Examples of polyester resins include a polyester resin obtained by a condensation reaction of a polyhydric alcohol, such as ethylene glycol, propylene glycol, butylene glycol, 1,6-hexanediol, trimethylolpropane, and pentaerythritol, with a polyvalent carboxylic acid component, such as adipic acid, isophthalic acid, terephthalic acid, phthalic anhydride, hexahydrophthalic anhydride, and trimellitic anhydride.

Examples of epoxy resins include epoxy ester resins obtained by a method in which an epoxy ester is synthesized by the reaction of an epoxy group and an unsaturated fatty acid, and an α,β-unsaturated acid is added to this unsaturated group; or by a method in which the hydroxyl group of epoxy ester and a polybasic acid, such as phthalic acid or trimellitic acid, are esterified.

Examples of urethane resins include urethane resins whose molecular weight is increased by reacting an acrylic resin, a polyester resin, or an epoxy resin mentioned above with a diisocyanate compound.

The colored coating composition (X) may be an aqueous coating composition or a solvent-based coating composition. However, in terms of reducing the VOC of the coating composition, the colored coating composition (X) is preferably an aqueous coating composition. When the colored coating composition (X) is an aqueous coating composition, the base resin can be made soluble in water or dispersed in water by using a resin containing a hydrophilic group, such as a carboxyl group, a hydroxyl group, a methylol group, an amino group, a sulfonic acid group, or a polyoxyethylene bond, most generally a carboxyl group, in an amount sufficient for making the resin soluble in water or dispersed in water, and neutralizing the hydrophilic group to form an alkali salt. The amount of the hydrophilic group (e.g., a carboxyl group) used in this case is not particularly limited, and can be suitably selected depending on the degree of water solubilization or water dispersion. However, the amount of the hydrophilic group is generally such that the acid value is about 10 mgKOH/g or more, and preferably 30 to 200 mgKOH/g. Examples of the alkaline substance used in neutralization include sodium hydroxide, amine compounds, and the like.

Moreover, dispersion of the above resin in water can be performed by emulsion polymerization of the above monomer components in the presence of a surfactant and a water-soluble resin. Furthermore, the water dispersion can also be obtained by, for example, dispersing the above resin in water in the presence of an emulsifier. In the water dispersion, the base resin may not contain the above hydrophilic group at all, or may contain the above hydrophilic group in an amount less than the water-soluble resin.

The crosslinking agent is used to crosslink and cure the base resin by heating. Examples include amino resins, polyisocyanate compounds, blocked polyisocyanate compounds, epoxy-containing compounds, carboxy-containing compounds, carbodiimide group-containing compounds, hydrazide group-containing compounds, semicarbazide group-containing compounds, and the like. Preferable among these are amino resins reactive with a hydroxyl group, polyisocyanate compounds, blocked polyisocyanate compounds, and carbodiimide group-containing compounds reactive with a carboxyl group. These crosslinking agents can be used singly or in a combination of two or more.

Specifically, amino resins obtained by condensation or co-condensation of formaldehyde with melamine, benzoguanamine, urea, or the like, or further etherification with a lower monohydric alcohol, are suitably used. Further, a polyisocyanate compound or a blocked polyisocyanate compound can also be suitably used.

The ratio of each component in the colored coating composition (X) may be freely selected as required. However, in terms of water resistance, finish, and the like, it is generally preferable that the proportion of the base resin is 60 to 90 masse, and particularly 70 to 85 mass %, based on the total mass of both components; and that the proportion of the crosslinking agent is 10 to 40 mass-, and particularly 15 to 30 mass %, based on the total mass of both components.

The pigment provides color and substrate-masking properties to the colored coating film formed from the colored coating composition (X). By adjusting the type and amount of the pigment, the lightness L* value of the coating film obtained from the colored coating composition (X) can be adjusted within the range of 70 to 95, and preferably 75 to 95. Examples of the pigment include metallic pigments, rust preventive pigments, color pigments, extender pigments, and the like. Of these, color pigments are preferably used, and titanium oxide pigments are more preferably used to impart a white metallic texture to the multilayer coating film.

Titanium oxide pigments are widely used as a white pigment because of their high refractive index. There are two types of titanium oxide pigments, namely, rutile type and anatase type, depending on their crystal structures. Both of these types are usable in the present invention; however, those of the rutile type is preferably used from the viewpoint of weather resistance. To improve the dispersibility and weather resistance, those subjected to surface treatment with inorganic compounds, such as silica, zirconium, and aluminum, may be used. In terms of the masking properties of the coating film, the primary particle diameter is preferably within the range of 100 to 500 nm, and more preferably within the range of 200 to 400 nm.

In the colored coating composition (X) of the present invention, color pigments other than the titanium oxide pigments above may further be used in a suitable combination depending on substrate-masking properties, desired color, and the like.

The type and amount of the pigment used in the colored coating composition (X) are preferably adjusted such that L* of the colored coating film is within the above range. Specifically, the titanium oxide pigment is preferably added in an amount of 50 to 200 parts by mass, and preferably 80 to 150 parts by mass, based on 100 parts by mass of the total amount of the base resin and the crosslinking agent.

The cured film thickness of the colored coating film obtained from the colored coating composition (X) is 15 to 50 μm, preferably 18 to 45 μm, and more preferably 20 to 40 μm, in terms of substrate-masking properties, metallic luster of the multilayer coating film, and the like.

Coating of the colored coating composition. (X) can be performed by a general method. When the colored coating composition (X) is an aqueous coating composition, for example, deionized water and optionally additives, such as a thickener and an antifoaming agent, are added to the colored coating composition (X) so that the solids content is adjusted to about 30 to 70 mass % and the viscosity is adjusted to 500 to 6000 cps/6 rpm (B-type viscometer). Then, the resultant is applied to the substrate surface by spray coating, rotary atomization coating, or the like. An electrostatic charge may be applied, if necessary, during coating.

The monochrome hiding film thickness of the colored coating composition (X) is preferably 80 μm or less, more preferably 10 to 60 μm, and still more preferably 15 to 50 μm, in terms of color stability. In the present specification, the "monochrome hiding film thickness" is a value obtained in the following manner. The monochrome checkered hiding power test paper specified in 4.1.2 of JIS K5600-4-1 is attached to a steel plate. Then, the coating composition is applied by inclined coating so that the film thickness continuously varies, and dried or cured. The coating surface is then visually observed under diffused daylight, and the minimum film thickness in which the monochrome border of the checker of the hiding power test paper disappears is measured by an electromagnetic film thickness meter. The measured value is the "monochrome hiding film thickness."

In the method for forming a multilayer coating film according to the present invention, the colored coating composition (X) is applied, and then crosslinked and cured at an ordinary temperature to about 150° C. An effect pigment dispersion (Y) can then be applied to the formed cured coating film to form an effect coating film; however, in terms of adhesion and water resistance of the multilayer coating film to be obtained, it is preferable to apply the colored coating composition (X) to form a colored coating film, apply an effect pigment dispersion (Y) to the uncured colored coating film to form an effect coating film, apply a clear coating composition (Z) to the uncured effect coating film to form an uncured clear coating film, and simultaneously cure these three uncured coating films by heating.

Effect Pigment Dispersion (Y)

The effect pigment dispersion (Y) contains water, a surface modifier (A), a flake-effect pigment (B) having an average thickness of 0.01 to 0.2 μm, and a viscosity modifier (C).

Surface Modifier (A)

The surface modifier (A) is used to facilitate uniform orientation of a flake-effect pigment (B) dispersed in water on the substrate when the effect pigment dispersion is applied to the substrate.

The surface modifier (A) is not particularly limited, as long as it has a contact angle of 8 to 20°, preferably 9 to 19°, and more preferably 10 to 18°, with respect to a previously degreased tin plate (produced by Paltek Corporation), the contact angle being measured in such a manner that a liquid that is a mixture of isopropanol, water, and the surface modifier (A) at a ratio of 4.5/95/1 is adjusted to have a viscosity of 150 mPa·s measured by a B-type viscometer at a rotor rotational speed of 60 rpm at a temperature of 20° C., 10 μL of the liquid is added dropwise to the tin plate, and the contact angle with respect to the tin plate is measured 10 seconds after dropping. Specifically, the viscosity is controlled by adding Acrysol ASE-60 (trade name, a polyacrylic acid-based viscosity modifier, produced by The Dow Chemical Company, solids content: 28%) and dimethylethanolamine.

The 4.5/95/1 ratio, which is the ratio of isopropanol/water/surface modifier (A), corresponds to the component ratio of the effect pigment dispersion (Y) for evaluating the surface modifier. The 150 mPa·s viscosity measured by a B-type viscometer at a rotor rotational speed of 60 rpm is a normal value during coating to a substrate. Moreover, the 8 to 20° contact angle with respect to the tin plate represents the wet spreading of liquid under standard coating conditions. When the contact angle is 8° or more, the liquid is applied to a substrate without being overly spread; whereas when the contact angle is 20° or less, the liquid is uniformly applied to a substrate without being overly repelled.

Examples of the surface modifier (A) include silicone-based surface modifiers, acrylic-based surface modifiers, vinyl-based surface modifiers, and fluorine-based surface modifiers. These surface modifiers can be used singly or in a combination of two or more.

Examples of commercial products of the surface modifier (A) include BYE; series (produced by BYK-Chemie), Tego series (produced by Evonik), Glanol series and Polyflow series (produced by Kyoeisha Chemical Co., Ltd.), DIS-PARLON series (produced by Kusumoto Chemicals, Ltd.), and the like.

The surface modifier (A) is preferably a silicone-based surface modifier, in terms of the metallic luster, water resistance, and the like, of the coating film to be obtained. Usable silicone-based surface modifiers include polydimethylsiloxane and modified silicone obtained by modifying polydimethylsiloxane. Examples of modified silicone include polyether-modified silicone, acrylic-modified silicone, polyester-modified silicone, and the like.

The dynamic surface tension of the surface modifier (A) is preferably 50 to 70 mN/m, more preferably 53 to 68 mN/m, and even more preferably 55 to 65 mN/m. In the present specification, the dynamic surface tension refers to a surface tension value measured by the maximum bubble pressure method at a frequency of 10 Hz.

Moreover, the static surface tension of the surface modifier (A) is preferably 15 to 30 mN/m, more preferably 18 to 27 mN/m, and even more preferably 20 to 24 mN/m. In the present specification, the static surface tension refers to a surface tension value measured by the platinum ring method (DCAT measurement).

Furthermore, the lamellar length of the surface modifier (A) is preferably 6.0 to 9.0 mm, more preferably 6.5 to 8.5 mm, and even more preferably 7.0 to 8.0 mm.

The surface modifier (A) is present in an amount of preferably 0.1 to 10 parts by mass, more preferably 0.2 to 8 parts by mass, and even more preferably 0.4 to 6 parts by mass, based on 100 parts by mass of the total amount of water, the surface modifier (A), the flake-effect pigment (B), and the viscosity modifier (C)

Flake-Effect Pigment (B)

Examples of the flake-effect pigment (B) in the effect pigment dispersion (Y) include vapor-deposition metal flake pigments, aluminum flake pigments, light interference pigments, and the like. Of these, vapor-deposition metal flake pigments are preferred, in terms of obtaining a coating film with excellent metallic luster.

The vapor-deposition metal flake pigment is obtained by vapor-depositing a metal film on a base material, removing the base material, and then grinding the vapor-deposition metal film. Examples of the base material include films and the like, The material of the above metal is not particularly limited. Examples include aluminum, gold, silver, copper, brass, titanium, chromium, nickel, nickel chromium, stainless steel, and the like. Of these, aluminum is preferable, in terms of easy availability, ease of handling, and the like, and so as to impart a white metallic texture to the multilayer coating film. In the present specification, a vapor-deposition metal flake pigment obtained by vapor deposition of aluminum refers to a "vapor-deposition aluminum flake pigment (B-1)."

Examples of commercial products that can be used as the vapor-deposition aluminum flake pigment (B-1) include "METALURE" series (trade name, produced by ECKART), "Hydroshine" series (trade name, produced by ECKART), "Decomet" series (trade name, produced by Schlenk), "Metasheen" series (trade name, produced by BASF), and the like.

The average thickness of the vapor-deposition metal flake pigment is preferably 0.01 to 0.2 μm, and more preferably 0.02 to 0.1 μm.

The average particle size (D50) of the vapor-deposition metal flake pigment is preferably 1 to 50 μm, and more preferably 5 to 25 μm.

The vapor-deposited aluminum flake pigment (B-1) may be surface treated in various ways. To achieve excellent storage stability of the effect pigment dispersion (Y), the surface is preferably treated with silica.

Aluminum flake pigments are generally produced by grinding or milling aluminum in a ball mill or an attritor mill in the presence of a grinding liquid medium using a grinding aid. For coating compositions, aluminum flake pigments having an average particle size (D50) of about 1 to 50 μm, and particularly about 5 to 25 μm, are generally used, in terms of the stability in the coating composition, and the finish of the coating film to be formed. The above-mentioned average particle size means a major axis. Usable grinding aids include higher fatty acids, such as oleic acid, stearic acid, isostearic acid, lauric acid, palmitic acid, and myristic acid; as well as aliphatic amine, aliphatic amide, and aliphatic alcohol. As the grinding liquid medium, an aliphatic hydrocarbon, such as a mineral spirit, is used.

The flake-effect pigment (B) is preferably present in an amount of preferably 0.05 to 3.0 parts by mass, more preferably 0.2 to 1.5 parts by mass, and even more preferably 0.3 to 0.6 parts by mass, based on 100 parts by mass of the total amount of water, the surface modifier (A), the flake-effect pigment (B), and the viscosity modifier (C).

Viscosity Modifier (C)

As the viscosity modifier (C) in the effect pigment dispersion (Y), a known viscosity modifier can be used. Examples include silica-based fine powder, mineral-based viscosity modifiers, barium sulfate atomization powder, polyamide-based viscosity modifiers, organic resin fine particle viscosity modifiers, diurea-based viscosity modifiers, urethane association-type viscosity modifiers, polyacrylic acid-based viscosity modifiers, which are of acrylic swelling-type, cellulose-based viscosity modifiers, and the like. Of these, in terms of obtaining a coating film with excellent metallic luster, it is particularly preferable to use a mineral-based viscosity modifier, a polyacrylic acid-based viscosity modifier, or a cellulose-based viscosity modifier.

Examples of mineral-based viscosity modifiers include swelling laminar silicate that has a 2:1 type crystal structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; and vermiculite; or substitution products and derivatives thereof, or mixtures thereof.

Examples of polyacrylic acid-based viscosity modifiers include sodium polyacrylate, polyacrylic acid-(meth)acrylic acid ester copolymers, and the like.

Examples of commercial products of the polyacrylic acid-based viscosity modifier include "Primal ASE-60," "Primal TT615," and "Primal RM5" (trade names, produced by The Dow Chemical Company); "SN Thickener 613," "SN Thickener 618," "SN Thickener 630," "SN Thickener 634," and "SN Thickener 636" (trade names, produced by San Nopco Limited); and the like. The acid value of the solids content of the polyacrylic acid-based viscosity modifier is 30 to 300 mgKOH/c, and preferably 80 to 280 mgKOH/g.

Examples of cellulose-based viscosity modifiers include carboxymethylcellulose, methylcellulose, hydroxyethylcellulose, hydroxyethylmethylcellulose, hydroxypropylmethylcellulose, methylcellulose, cellulose nanofiber gel, and the like. Of these, cellulose nanofiber gel is particularly preferable, because the coating film to be obtained has excellent metallic luster. Examples of commercial products thereof include "Rheocrysta" (trade name, produced by DKS Co., Ltd.) and the like.

These viscosity modifiers can be used singly or in a suitable combination of two or more.

To obtain a coating film with excellent metallic luster, the amount of the viscosity modifier (C) is preferably within the range of 0.1 to 26 parts by mass, more preferably within the range of 0.5 to 10 parts by mass, and particularly preferably within the range of 1.0 to 5.0 parts by mass, based on 100 parts by mass of the flake-effect pigment (B).

Other Components

The effect pigment dispersion (Y) may further suitably contain, if necessary, an organic solvent, a color pigment (0), a pigment dispersant, an antisettling agent, an antifoaming agent, an ultraviolet absorber, a surface modifier other than the surface modifier (A), or the like.

The effect pigment dispersion (Y) may contain a base resin, a crosslinking agent, and a dispersion resin, in terms of the adhesion and storage stability of the coating film to be obtained. However, the effects of the present invention can be exhibited even if these resins are not substantially contained.

The color pigment (D) may be a titanium oxide pigment, a zinc oxide pigment, a silica pigment, or the like, which are white pigments with a light-scattering effect, in, terms of obtaining a multilayer coating film with a white metallic texture. In particular, a titanium oxide pigment, which is mentioned above as a component that can be incorporated into the colored coating composition (X), is preferably used.

The color pigment (D) may be incorporated as a powder in the effect pigment dispersion (Y). To prepare the effect pigment dispersion (Y), it is also possible to first prepare a color pigment dispersion by mixing and dispersing the color pigment in the resin composition, and mix the resulting color pigment dispersion with other components. In the preparation of the color pigment dispersion, conventional additives used for coating compositions, such as a defoaming agent, a dispersant, a surface modifier, and the like may optionally be added.

Examples of the base resin include acrylic resins, polyester resins, alkyd resins, urethane resins, and the like.

Examples of the crosslinking agent include melamine resin, melamine resin derivatives, urea resin, (meth)acrylamide, polyaziridine, polycarbodiimide, and blocked or unblocked polyisocyanate compounds. These may be used singly, or in a combination of two or more.

As the dispersion resin, existing dispersion resins, such as acrylic resins, epoxy resins, polycarboxylic acid resins, and polyester resins, can be used.

When the base resin, the crosslinking agent, and the dispersion resin are contained in the effect pigment dispersion (Y), the total amount of the base resin, the crosslinking agent, and the dispersion resin is preferably 0.01 to 500 parts by mass, more preferably 5 to 300 parts by mass, and still more preferably 10 to 200 parts by mass, based on 100 parts by mass of the flake-effect pigment.

Amount of Each Component in Effect Pigment Dispersion (Y)

The effect pigment dispersion (Y) contains water, a surface modifier (A), a flake-effect pigment (B), and a viscosity modifier (C). The proportions (solids mass) of each component in the effect pigment dispersion (Y) are preferably within the following ranges to obtain a coating film with excellent metallic luster.

The following amounts are based on 100 parts by mass of the total amount of water, the surface modifier (A), the flake-effect pigment (B), and the viscosity modifier (C).

Water: 70 to 99 parts by mass, preferably 80 to 99 parts by mass, and more preferably 90 to 99 parts by mass;

Surface modifier (A): 0.1 to 10 parts by mass, preferably 0.2 to 8 parts by mass, and more preferably 0.4 to 6 parts by mass;

Flake-effect pigment (B): 0.05 to 3.0 parts by mass, preferably 0.2 to 1.5 parts by mass, and more preferably 0.3 to 0.6 parts by mass; and Viscosity modifier (C): 0.1 to 26 parts by mass, preferably 0.5 to 10 parts by mass, and more preferably 1.0 to 5.0 parts by mass.

When the effect pigment dispersion (Y) contains a titanium oxide pigment as the color pigment (D), the amount thereof is preferably 0.05 to 400 parts by mass, more preferably 100 to 400 parts by mass, and still more preferably 200 to 400 parts by mass, based on 100 parts by mass of the flake-effect pigment (B), to impart a white metallic texture to the multilayer coating film to be obtained.

Coating of Effect Pigment Dispersion (Y)

The effect pigment dispersion (Y) is prepared by mixing and dispersing the above components. In terms of obtaining a coating film with excellent metallic luster, the solids content during coating is preferably adjusted to 0.1 to 15 mass %, and more preferably 0.2 to 5.0 mass %, based on the effect pigment dispersion (Y).

The viscosity of the effect pigment dispersion (Y) at a temperature of 20° C. measured by a B-type viscometer at 60 rpm after 1 minute (also referred to as "the B60 value" in the present specification) is preferably 30 to 1000 mPa·s, in terms of obtaining a coating film with excellent metallic luster. The viscometer used in this case is a B-type viscometer (trade name: LVDV-I, produced by Brookfield).

The effect pigment dispersion (Y) can be applied by a method such as electrostatic spraying, air spray coating, or airless spray coating. In the method for forming a multilayer coating film of the present invention, rotary atomization type electrostatic spraying is particularly preferable.

It is preferable that the effect coating film obtained by applying the effect pigment dispersion (Y) is dried. The method of drying the effect coating film is not particularly limited. For example, a method that allows the coating film to stand at ordinary temperature for 15 to 30 minutes, a method that performs preheating at a temperature of 50 to 100° C. for 30 seconds to 10 minutes, or the like, can be used.

The film thickness 30 seconds after the effect pigment dispersion (Y) is attached to the substrate is preferably 3 to 25 μm, more preferably 4 to 24 μm, and even more preferably 5 to 23 μm, in terms of obtaining a coating film with excellent metallic luster.

The thickness of the effect coating film, as dry film thickness, is preferably 0.05 to 2.0 μm, and more preferably 0.08 to 1.6 μm.

In the method for forming a multilayer coating film according to the present invention, a clear coating composition (Z) is applied to the effect coating film obtained by applying the effect pigment dispersion (Y), thus forming a clear coating film.

Clear Coating Composition (Z)

The clear coating composition (Z) for use may be any of known thermosetting clear-coat coating compositions. Examples of the thermosetting clear-coat coating composition include those containing a base resin having crosslinkable functional groups and a curing agent, such as organic solvent-based thermosetting coating compositions, aqueous thermosetting coating compositions, and powdery thermosetting coating compositions.

Examples of the crosslinkable functional groups contained in the base resin include a carboxyl group, a hydroxy group, an epoxy group, a silanol group, and the like. Examples of the type of the base resin include acrylic resin, polyester resin, alkyd resin, urethane resin, epoxy resin, fluorine resin, and the like. Examples of the curing agent include polyisocyanate compounds, blocked polyisocyanate compounds, melamine resin, urea resin, carboxy-containing compounds, carboxy-containing resin, epoxy-containing resin, epoxy-containing compounds, and the like.

The combination of the base resin and the curing agent for the clear coating composition (Z) is preferably a carboxy-containing resin and an epoxy-containing resin, a hydroxy-containing resin and a polyisocyanate compound, a hydroxy-containing resin and a blocked polyisocyanate compound, a hydroxy-containing resin and melamine resin, and the like.

The clear coating composition (Z) may be a one-component coating composition or a multi-component coating composition, such as a two-component coating composition.

In particular, the clear coating composition (Z) is preferably a two-component clear coating composition containing the following hydroxy-containing resin and a polyisocyanate compound, in terms of the adhesion of the obtained coating film.

When a two-component clear coating composition containing a hydroxy-containing resin and an isocyanate-containing compound is used as the clear coating composition (Z), it is preferred, in terms of storage stability, that the hydroxy-containing resin and the polyisocyanate compound be separately present in their own form. These are mixed and prepared into a two-component composition immediately before use.

When a one-component coating composition is used as the clear coating composition (Z), examples of combinations of a base resin and a curing agent in the one-component composition include a carboxy-containing resin and an epoxy-containing resin, a hydroxy-containing resin and a blocked polyisocyanate compound, a hydroxy-containing resin and a melamine resin, and the like.

Hydroxy-Containing Resin

As the hydroxy-containing resin, conventionally known resins can be used without limitation, as long as they contain hydroxyl groups. Examples of the hydroxy-containing resin include hydroxy-containing acrylic resins, hydroxy-containing polyester resins, hydroxy-containing polyether resins, hydroxy-containing polyurethane resins, and the like; preferably hydroxy-containing acrylic resins and hydroxy-containing polyester resins; and particularly preferably hydroxy-containing acrylic resins.

The hydroxy value of the hydroxy-containing acrylic resin is preferably within the range of 80 to 200 mgKOH/g, and more preferably 100 to 180 mgKOH/g, in terms of obtaining a coating film with excellent scratch resistance and water resistance.

The weight average molecular weight of the hydroxy-containing acrylic resin is preferably within the range of 2500 to 40000, and more preferably 5000 to 30000, in terms of obtaining a coating film with acid resistance and smoothness.

In the present specification, the weight average molecular weight refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns: "TSKgel G-4000HXL," "TSKgel G-3000HXL," "TSKgel G-2500HXL," and "TSKgel G-2000HXL" (trade names, all produced by Tosoh Corporation) under the following conditions: mobile phase: tetrahydrofuran, measuring temperature: 40° C., flow rate: 1 cc/min, and detector: RI.

The glass transition temperature of the hydroxy-containing acrylic resin is −40° C. to 20° C., and particularly preferably −30° C. to 10° C. When the glass transition temperature is less than −40° C., the coating film hardness may be insufficient. When the glass transition temperature exceeds 20° C., the coating surface smoothness of the coating film may be reduced.

Polyisocyanate Compound

A polyisocyanate compound is a compound having at least two isocyanate groups in one molecule. Examples include aliphatic polyisocyanates, alicyclic polyisocyanates, aliphatic-aromatic polyisocyanates, aromatic polyisocyanates, derivatives of these polyisocyanates, and the like.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and 2,6-diisocyanatomethyl hexanoate (common name: lysine diisocyanate); aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl)diisocyanate (common name: hydrogenated MDI), and norbornane diisocyanate; alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethy-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aliphatic-aromatic polyisocyanates include aliphatic-aromatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aliphatic-aromatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyldiisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; aromatic tetraisocyanates, such as 4,4'-diphenylmethane-2,2',5,5'-tetraisocyanate; and the like.

Examples of polyisocyanate derivatives include dimers, trimers, biurets, allophanates, urethodiones, urethoimines, isocyanurates, oxadiazinetriones, polymethylene polyphenyl polyisocyanates (crude MDI, polymeric MDI), crude TDI, and the like, of the above-mentioned polyisocyanates. These polyisocyanate derivatives may be used singly, or in a combination of two or more.

The above polyisocyanates and derivatives thereof may be used singly, or in a combination of two or more.

Among the aliphatic diisocyanates, hexamethylene diisocyanate compounds are preferably used, and among the alicyclic diisocyanates, 4,4'-methylenebis(cyclohexylisocyanate) is preferably used. Of these, derivatives of hexamethylene diisocyanate are particularly the most preferable, in terms of adhesion, compatibility, and the like.

As the polyisocyanate compound, a prepolymer is also usable that is formed by reacting the polyisocyanate or a derivative thereof with a compound having active hydrogen, such as hydroxy or amino, and reactive to the polyisocyanate under conditions such that the isocyanate groups are present, in excess. Examples of the compound reactive to the polyisocyanate include polyhydric alcohols, low-molecular-weight polyester resins, amine, water, and the like.

The polyisocyanate compound for use may be a blocked polyisocyanate compound in which some or all of the isocyanate groups of the above polyisocyanate or a derivative thereof are blocked with a blocking agent.

Examples of the blocking agents include phenols, such as phenol, cresol, xylenol, nitrophenol, ethylphenol, hydroxydiphenyl, butylphenol, isopropylphenol, nonylphenol, octylphenol, and methyl hydroxybenzoate; lactam compounds, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, t-butyl mercaptan, hexyl mercaptan, t-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, acetic acid amide, stearic acid amide, and benzamide; imides, such as succinimide, phthalimide, and maleimide; amines, such as diphenylamine, phenyl naphthylamine, xylidine, N-phenylxylidine, carbazole, aniline, naphthylamine, butylamine, dibutylamine, and butylphenylamine; imidazoles, such as imidazole and 2-ethylimidazole; ureas, such as urea, thiourea, ethylene urea, ethylenethiourea, and diphenylurea; carbamate esters, such as phenyl N-phenylcarbamate; imines, such as ethyleneimine and propyleneimine; sulfites, such as sodium bisulfite and potassium bisulfite; azole-based compounds; and the like. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

When blocking is performed (a blocking agent is reacted), it can be performed by adding a solvent, if necessary. As the solvent used in the blocking reaction, a solvent that is not reactive with an isocyanate group is preferably used. Examples include ketones, such as acetone and methyl ethyl ketone; esters, such as ethyl acetate; N-methyl-2-pyrrolidone (NMP); and like solvents.

The polyisocyanate compounds can be used singly, or in a combination of two or more.

The polyisocyanate compounds can be used singly, or in a combination of two or more. In the present invention, the equivalent ratio of the hydroxy groups in the hydroxy-containing resin to the isocyanate groups in the polyisocyanate compound (OH/NCO) is preferably within the range of 0.5 to 2.0, and more preferably 0.8 to 1.5 in terms of the curability of the coating film, scratch resistance, and the like.

The clear coating composition (Z) may further suitably contain additives, such as a solvent (e.g., water and organic solvents), a curing catalyst, an antifoaming agent, and an ultraviolet absorber, if necessary.

The clear coating composition (Z) may suitably contain a color pigment within a range that does not impair transparency. As the color pigment, conventionally known pigments for ink or coating compositions can be used singly, or in a combination of two or more. The amount thereof to be added may be suitably determined, but is 30 parts by weight or less, and more preferably 0.01 to 10 parts by weight, based on 100 parts by mass of the vehicle-forming resin composition contained in the clear coating composition (Z).

The form of the clear coating composition (Z) is not particularly limited. The clear coating composition (Z) is generally used as an organic solvent-based coating composition. Examples of the organic solvent used in this case include various organic solvents for coating compositions, such as aromatic or aliphatic hydrocarbon solvents, ester solvents, ketone solvents, ether solvents, and the like. As the organic solvent used here, the one used in the preparation of the hydroxy-containing resin may be used as is, or other organic solvents may be further suitably added.

The solids concentration of the clear coating composition (Z) is preferably about 30 to 70 mass %, and more preferably about 40 to 60 mass %.

The clear coating composition (Z) is applied to the effect coating film. The coating of the clear coating composition (Z) is not particularly limited, and the same method as those for the colored coating composition may be used. For example, the clear coating composition (Z) can be applied by a coating method, such as air spray coating, airless spray coating, rotary atomization coating, or curtain coating. In these coating methods, an electrostatic charge may be applied, if necessary. Among these, rotary atomization coating using an electrostatic charge is preferable. The coating amount of the clear coating composition (Z) is generally preferably an amount in which the cured film thickness is about 10 to 50 μm.

Moreover, when the clear coating composition (Z) is applied, it is preferable to suitably adjust the viscosity of the clear coating composition (Z) within a viscosity range suitable for the coating method. For example, for rotary atomization coating using an electrostatic charge, it is preferable to suitably adjust the viscosity of the clear coating composition (Z) within the range of about 15 to 60 seconds measured by a Ford cup No. 4 viscometer at 20° C. using a solvent, such as an organic solvent.

In the method for forming a multilayer coating film according to the present invention, the uncured colored coating film, the uncured effect coating film, and the uncured clear coating film are heated to simultaneously cure these three coating films. Heating can be performed by a known means. For example, a drying furnace, such as a hot-blast furnace, an electric furnace, or an infrared beam heating furnace, can be used. The heating temperature is preferably within the range of 70 to 150° C., and more preferably 80 to 140° C. The heating time is not particularly limited, but is preferably within the range of 10 to 40 minutes, and more preferably 20 to 30 minutes.

EXAMPLES

The present invention is described below in more detail with reference to Examples and Comparative Examples. However, the present invention is not limited only to these Examples. "Part(s)" and "%" are both based on mass.

Production Example 1: Production of Polyester Resin 109 parts by mass of trimethylolpropane, 141 parts by mass of 1,6-hexanediol, 126 parts by mass of hexahydrophthalic anhydride, and 120 parts by mass of adipic acid were placed in a reactor equipped with a thermometer, a thermostat, a stirrer, a reflux condenser, and a water separator. After the temperature was increased from 160° C. to 230° C. over 3 hours, a condensation reaction was performed at 230° C. for 4 hours. Subsequently, in order to add carboxyl groups to the resulting condensation reaction product, 38.3 parts by mass of trimellitic anhydride was further added, and allowed to react at 170° C. for 30 minutes. The reaction product was then diluted with 2-ethyl-1-hexanol, thereby obtaining a polyester resin solution having a solids concentration of 70%. The obtained polyester resin had an acid value of 46 mgKOH/g, a hydroxy value of 150 mgKOH/g, and a weight average molecular weight of 6,400. The weight average molecular weight as used herein refers to a value as determined by gel permeation chromatography (GPC) using the calibration curve of standard polystyrene.

Production Example 2: Preparation of Color Pigment Dispersion 5 parts (solids content: 3.5 parts) of the polyester resin obtained in Production Example 1, 35 parts of JR-903 (trade name, rutile titanium dioxide pigment, produced by Tayca Corporation), and 60 parts of deionized water were placed into a stirring-and-mixing container, and homogeneously mixed. Further, 2-(dimethylamino)ethanol was added thereto, and the mixture was adjusted to pH 7.5. The obtained mixture was placed in a 225-ml resin bottle, and then 130 parts of zirconia beads having a diameter of 1.5 mm were added thereto. The bottle was hermetically sealed, and the mixture was dispersed for 120 minutes using a shaker-type paint conditioner. After dispersion, the obtained dispersion was filtered through a 100-mesh wire screen to remove the zirconia beads, thereby obtaining a color pigment dispersion.

Production Example 3: Production of Acrylic Resin Emulsion 130 parts by mass of deionized water and 0.52 parts by mass of Aqualon KH-10 (trade name, surfactant, produced by INKS Co., Ltd.) were placed into a reactor equipped with a thermometer, a thermostat, a stirrer, a reflux condenser, and a dropping funnel, and mixed while stirring in a nitrogen stream, followed by heating to 80° C. Subsequently, 1% of monomer emulsion (1) detailed below and 5.3 parts by mass of a 6% ammonium persulfate aqueous solution were placed into the reactor and maintained at 80° C. for 15 minutes. Thereafter, the remaining monomer emulsion (1) was added dropwise over a period of 3 hours to the reactor maintained at the same temperature. After completion of the dropwise addition, the mixture was aged for 1 hour. Thereafter, monomer emulsion (2) detailed below was added dropwise over a period of 1 hour, and the mixture was aged for 1 hour. The mixture was then cooled to 30° C. while 40 parts by mass of a 5% aqueous dimethylethanolamine solution was gradually added to the reactor, and the cooled mixture was filtered through a 100-mesh nylon cloth, thereby obtaining an acrylic resin emulsion having an average particle size of 100 nm (after dilution with deionized water, the average particle size was measured at 20° C. using a "Coulter N4" submicron particle size distribution analyzer produced by Beckman Coulter) and a solids concentration of 30%. The obtained acrylic resin emulsion had an acid value of 33 mg KOH/g and a hydroxy value of 25 mg KOH/g.

Monomer emulsion (1): 42 parts by mass of deionized water, 0.72 parts by mass of Aqualon KH-10, 2.1 parts by mass of methylenebisacrylamide, 2.8 parts by mass of styrene, 16.1 parts by mass of methyl methacrylate, 28 parts by mass of ethyl acrylate, and 21 parts by mass of n-butyl acrylate were mixed with stirring, thereby obtaining monomer emulsion (1).

Monomer emulsion (2): 18 parts by mass of deionized water, 0.31 parts by mass of Aqualon KH-10, 0.03 parts by mass of ammonium persulfate, 5.1 parts by mass of methacrylic acid, 5.1 parts by mass of 2-hydroxyethyl acrylate, 3 parts by mass of styrene, 6 parts by mass of methyl methacrylate, 1.8 parts by mass of ethyl acrylate, and 9 parts by mass of n-butyl acrylate were mixed while stirring, thereby obtaining monomer emulsion (2).

Production Example 4: Preparation of Effect Pigment Dispersion (Y-1)

92 parts of distilled water, 1 part of the surface modifier A-1 (Note 1), 5 parts (solids content: 0.5 parts) of Hydroshine WS-3004 (trade name, an aqueous vapor-deposition aluminum flake pigment, produced by Eckart, solids content: 10%, internal solvent: isopropanol, average particle size D50: 13 μm, thickness: 0.05 μm; the surface was treated with silica), 1.7 parts (solids content: 0.48 parts) of Acrysol ASE-60 (a polyacrylic acid-based viscosity modifier, produced by The Dow Chemical Company, solids content: 28%), and 0.17 parts of dimethylethanolamine were blended, stirred, and mixed, thereby obtaining an effect pigment dispersion (Y-1).

Note 1: Surface modifier A-1: trade name "BYK348," produced by BYK, a silicone-based surface modifier Contact angle=13°, dynamic surface tension (mN/m)=63.9, static surface tension (mN/m)=22.2, and lamella length=7.45 mm; the contact angle refers to a contact angle with respect to a tin plate, the contact angle being measured in such a manner that a liquid that was a mixture of isopropanol, water, and the surface modifier (A-1) at a ratio of 4.5/95/1 was adjusted to have a viscosity of 100 mPa·s measured by a B-type viscometer at a rotor rotational speed of 60 rpm at a temperature of 20° C., 10 μL of the liquid was added dropwise to a previously degreased tin plate (produced by Paltek Corporation), and the contact angle with respect to the tin plate was measured 10 seconds after the dropwise addition with a contact angle meter (CA-X150, trade name, produced by Kyowa Interface Science Co., Ltd.).

Production Examples 5 to 9: Production. of Effect Pigment Dispersions (Y-2) to (Y-6)

Effect pigment dispersions (Y-2) to (Y-6) were obtained in the same manner as in Production Example 4, except that the formulations shown in Table 1 were used.

TABLE 1

|  | Effect pigment dispersion 1 Y1 | Effect pigment dispersion 2 Y-2 | Effect pigment dispersion 3 Y-3 | Effect pigment dispersion 4 Y-4 | Effect pigment dispersion 5 Y-5 | Effect pigment dispersion 6 Y-8 |
|---|---|---|---|---|---|---|
| Distilled water | 92.0 | 92.0 | 92.0 | 92.0 | 92.0 | 92.0 |
| Surface modifier A-1 | 1.0 | 1.0 | 1.0 | 1.0 | 1.0 | 1.0 |
| Vapor-deposition aluminum flake pigment *1 | 5.0 | 5.0 | 10.0 | 5.0 | 10.0 | 5.0 |

TABLE 1-continued

|  | Effect pigment dispersion 1 Y1 | Effect pigment dispersion 2 Y-2 | Effect pigment dispersion 3 Y-3 | Effect pigment dispersion 4 Y-4 | Effect pigment dispersion 5 Y-5 | Effect pigment dispersion 6 Y-8 |
|---|---|---|---|---|---|---|
| Color pigment dispersion | — | 2.9 | 2.9 | 5.8 | — | 11.6 |
| ASE-60 | 1.7 | 1.7 | 1.7 | 1.7 | 1.7 | 1.7 |
| Dimethylethanolamine | 0.17 | 0.17 | 0.17 | 0.17 | 0.17 | 0.17 |

*1: Hydroshane WS-3004 (trade name, an aqueous vapor-deposition aluminum flake pigment, produced by Eckart, solids content: 10%; internal solvent: isopropanol, average particle size D50: 13 μm, thickness: 0.05 μm; the surface was treated with silica)

Production Example 10: Production of Phosphoric Acid Group-Containing Resin Solution A mixture solvent containing 27.5 parts of methoxypropanol and 27.5 parts of isobutanol was placed into a reactor equipped with a thermometer, a thermostat, a stirrer, a reflux condenser, and a dropping funnel, and heated to 110° C. While the reactor was maintained at 110° C., 121.5 parts of a mixture containing 25 parts of styrene, 27.5 parts of n-butyl methacrylate, 20 parts of branched higher alkyl acrylate (trade name "isostearyl acrylate," produced by Osaka Organic Chemical Industry Ltd.), 7.5 parts of 4-hydroxy butyl acrylate, 15 parts of the phosphoric acid group-containing polymerizable monomer detailed below, 12.5 parts of 2-methacryloyloxy ethyl acid phosphate, 10 parts of isobutanol, and 4 parts of tert-butylperoxy octanoate was added dropwise to the mixture solvent over a period of 4 hours. Further, a mixture of 0.5 parts of tert-butylperoxy octanoate and 20 parts of isopropanol was added dropwise thereto over a period of 1 hour. Thereafter, the mixture was aged for 1 hour with stirring, thereby obtaining a phosphoric acid group-containing resin solution having a solids content of 50%. The phosphoric acid group-containing resin had an acid value of 83 mg KOH/g, a hydroxy value of 29 mg KOH/g, and a weight average molecular weight of 10,000.

Phosphoric acid group-containing polymerizable monomer 57.5 parts of monobutyl phosphoric acid and 41 parts of isobutanol were placed into a reactor equipped with a thermometer, a thermostat, a stirrer, a reflux condenser, and a dropping funnel, and heated to 90° C. Thereafter, 42.5 parts of glycidyl methacrylate was added dropwise thereto over a period of 2 hours, and then further aged with stirring for 1 hour. Subsequently, 59 parts of isopropanol was added thereto, thereby obtaining a phosphoric acid group-containing polymerizable monomer solution having a solids content of 50%, The obtained monomer had an acid value of 285 mg KOH/g.

Production Example 11: Preparation of High-Concentration Aluminum Pigment Liquid 14.3 parts (solids content: 10 parts) of aluminum paste 6360NS (trade name, aluminum flake pigment, average particle size: 12 μm, aluminum content: 70%, produced by Toyo Aluminium K.K.), 8 parts (solids content: 4 parts) of the phosphoric acid-containing resin solution obtained in Production Example 6, 37.7 parts of 2-ethyl-1-hexanol (mass dissolved in 100 g of water at 20° C.), and 0.5 part of 2-(dimethylamino)ethanol were homogeneously mixed in a stainless steel beaker, thereby obtaining a high-concentration aluminum pigment liquid.

Production Example 12: Preparation of Metallic Base Coating Composition 1

100 parts of the acrylic resin emulsion obtained in Production Example 3, 57.1 parts of the polyester resin solution obtained in Production Example 1, 72.6 parts of the high-concentration aluminum pigment liquid obtained in Production Example 11, and 37.5 parts of Cymel 325 (trade name, produced by Cytec Industries Japan LLC, melamine resin, solids content: 80%) were homogeneously mixed. Further, Primal ASE-60 (trade name, produced by Rohm & Haas, polyacrylic acid thickener), 2-(dimethylamino)ethanol, and deionized water were added thereto, thereby obtaining an aqueous coating composition having a pH of 8.0, a coating composition solids content of 25%, and a viscosity of 40 seconds as measured by Ford cup No. 4 at 20° C.

Production Example 13: Preparation of Metallic Base Coating Composition 2

100 parts of the acrylic resin emulsion obtained in Production Example 3, 57.1 parts of the polyester resin solution obtained in Production Example 1, 72.6 parts of the high-concentration aluminum pigment liquid obtained in Production Example 11, 68.6 parts of color pigment dispersion obtained in Production Example 2, and 37.5 parts of Cymel 325 (trade name, produced by Cytec Industries Japan LLC, melamine resin, solids content: 80%) were homogeneously mixed. Further, Primal ASE-60 (trade name, produced by Rohm & Haas, polyacrylic acid thickener), 2-(dimethylamino)ethanol, and deionized water were added thereto, thereby obtaining an aqueous coating composition having a pH of 8.0, a coating composition solids content of 25%, and a viscosity of 40 seconds as measured by Ford cup No. 4 at 20° C.

Production Example 14: Preparation of Metallic Base Coating Composition 3

100 parts of the acrylic resin emulsion obtained in Production Example 3, 57.1 parts of the polyester resin solution obtained in Production Example 1, 7 parts of Xirallic T60-10WNT CrystalSilver (trade name, titanium oxide-coated alumina flake pigment, produced by Merck & Co., Inc.), and 37.5 parts of Cymel 325 (trade name, produced by Cytec Industries Japan LLC, melamine resin, solids content: 80%) were homogeneously mixed. Further, Primal ASE-60 (trade name, produced by Rohm & Haas, polyacrylic acid thickener), 2-(dimethylamino)ethanol, and deionized water were added thereto, thereby obtaining an aqueous coating composition having a pH of 8.0, a coating composition solids content of 25%, and a viscosity of 40 seconds as measured by Ford cup No. 4 at 20° C.

Production Example 15: Production of Substrate 1

A cationic electrodeposition coating composition "Elecron 9400HB" (trade name, produced by Kansai Paint Co., Ltd., an amine-modified epoxy resin-based cationic resin containing a blocked polyisocyanate compound as a curing agent) was applied by electrodeposition to a degreased and zinc phosphate-treated steel plate (JISG3141, size: 400×300×0.8 mm) to a film thickness of 20 μm when cured. The resulting film was heated at 170° C. for 20 minutes to be cured by crosslinking, thereby obtaining a substrate 1.

Example 1

A colored coating composition (X-1) "WP-522H N-9.0" (trade name, produced by Kansai Paint Co., Ltd., a polyester resin-based aqueous intermediate coating composition, L* value of the coating film to be obtained: 90) was applied to the substrate 1 to a cured film thickness of 30 μm by electrostatic spraying using a rotary atomization-type bell-shaped coating device. After the resulting film was allowed to stand for 3 minutes, preheating was performed at 80° C. for 3 minutes. Further, the effect pigment dispersion (Y-1) produced as described above was applied to a dry coating film thickness of 0.2 μm using a robot bell (produced by ABB) at a booth temperature of 23° C. and at a humidity of 68%, The resultant was then allowed to stand at 80° C. for 3 minutes. Subsequently, a clear coating composition (S-1) "KIN06500" (trade name, produced by Kansai Paint Co., Ltd., a hydroxy/isocyanate curable acrylic resin/urethane resin-based two-component organic solvent-based coating composition) was applied to a dry coating film thickness of 30 μm using a robot bell (produced by ABB) at a booth temperature of 23° C. and at a humidity of 68%. After coating, the resultant was allowed to stand at room temperature for 15 minutes, and then heated in a hot-air circulation-type dryer at 140° C. for 30 minutes to simultaneously dry the multilayer coating films, thereby obtaining a test plate. The film thickness of the dry coating film was calculated from the following formula. The same applies to the following Examples and Comparative Examples.

x=sc/sg/S*10000
x: film thickness [μm]
sc: coating solids content [g]
sg: coating film specific gravity [g/cm$^3$]
S: evaluation area of coating solids content. [cm$^2$]

Examples 2 to 8 and Comparative Examples 1, 5, and 6

Test plates were obtained in the same manner as in Example 1, except that the substrates and coating compositions shown in Table 2 were used.

TABLE 2

|  | Ex. 1 | Ex. 2 | Ex. 3 | EX. 4 | Ex. 5 | Ex. 6 | Ex. 7 | Ex. 8 |
| --- | --- | --- | --- | --- | --- | --- | --- | --- |
| Substrate | Substrate 1 | Substrate 1 | Substrate 1 | Substrate 1 | Substrate 1 | Substrate 1 | Substrate 1 | Substrate 1 |
| Colored coating composition (intermediate) | X-1 | X-2[*1] | X-1 | X-1 | X-1 | X-4[*3] | X-1 | X-1 |
| Intermediate lightness L* | 90 | 80 | 90 | 90 | 90 | 70 | 90 | 90 |
| Effect pigment dispersion/metallic base coating composition | Y-1 | Y-2 | Y-2 | Y-2 | Y-2 | Y-2 | Y-3 | Y-4 |
| Effect coating film dry film thickness (μm) | 0.2 | 0.2 | 0.2 | 0.4 | 0.7 | 0.2 | 0.2 | 0.5 |
| Lightness L*110 in the shade region | 61 | 62 | 68 | 62 | 60 | 60 | 62 | 76 |
| Specular gloss 60° gloss | 143 | 114 | 110 | 106 | 105 | 112 | 111 | 105 |
| HG (graininess) | 29 | 26.5 | 30.9 | 24.2 | 22 | 28.4 | 25.7 | 18.1 |
| Flip-flop value | 1.29 | 1.22 | 1.14 | 1.2 | 1.26 | 1.36 | 1.1 | 1.05 |

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Substrate | Substrate 1 | Substrate 1 | Substrate 1 | Substrate 1 | Substrate 1 | Substrate 1 |
| Colored coating composition (intermediate) | X-3[*2] | X-1 | X-1 | X-1 | X-1 | X-1 |
| Intermediate lightness L* | 60 | 90 | 90 | 90 | 90 | 90 |
| Effect pigment dispersion/metallic base coating composition | Y-1 | Metallic base coating composition 1 | Metallic base coating composition 2 | Metallic base coating composition 3 | Y-5 | Y-6 |
| Effect coating film dry film thickness (μm) | 0.2 | 15.0 | 15.0 | 15.0 | 0.2 | 0.5 |
| Lightness L*110 in the shade region | 31 | 33 | 63 | 81 | 57 | 81 |
| Specular gloss 60° gloss | 144 | 100 | 95 | 97 | 166 | 98 |
| HG (graininess) | 26.9 | 54 | 39 | 66 | 27.1 | 12.6 |
| Flip-flop value | 1.58 | 1.43 | 0.62 | 0.64 | 1.32 | 0.86 |

[*1]Colored coating composition (X-2) "WP-522H N-8.0" (trade name, produced by Kansai Paint Co., Ltd., polyester resin-based aqueous intermediate coating composition, L* value of the coating film obtained: 80)
[*2]Colored coating composition (X-3) "WP-522H N-6.0" (trade name, produced by Kansai Paint Co., Ltd., polyester resin-based aqueous intermediate coating composition, L* value of the coating film obtained: 60)
[*3]Colored coating composition (X-4) "HP-522H N-7.0" trade name, produced by Kansai Paint Co., Ltd., polyester resin-based aqueous intermediate coating composition, L* value of the coating film obtained: 70)

Comparative Example 2

A colored coating composition (X-1) WP-522H N-9.0 (trade name, produced by Kansai Paint Co., Ltd., a polyester resin-based aqueous intermediate coating composition, L* value of the coating film to be obtained: 90) was applied to the substrate 1 to a cured film thickness of 30 μm by electrostatic spraying using a rotary atomization-type bell-shaped coating device. After the resulting film was allowed to stand for 3 minutes, preheating was performed at 80° C. for 3 minutes. Further, the metallic base coating composition 1 produced in Production Example 8 was applied to the resulting film to a dry coating film thickness of 15 μm using a robot bell (produced by ABB) at a booth temperature of 23° C. and at a humidity of 68%. The resultant was then allowed to stand at 80° C. for 3 minutes. Subsequently, a clear coating composition (Z-1) K1N06500 (trade name, produced by Kansai Paint Co., Ltd., a hydroxy/isocyanate curable acrylic resin/urethane resin-based two-component organic solvent-based coating composition) was applied to the dried coating surface to a dry coating film thickness of 25 to 35 μm using a robot bell (produced by ABB) at a booth temperature of 23° C. and at a humidity of 68%. After coating, the resultant was allowed to stand at room temperature for 15 minutes, and then heated in a hot-air circulation-type dryer at 140° C. for 30 minutes to simultaneously dry the multilayer coating films, thereby obtaining a test plate.

Comparative Examples 3 and 4

Test plates were obtained in the same manner as in Comparative Example 2, except that the substrates and coating compositions shown in Table 2 were used.
Evaluation of Coating Film The appearance and performance of the coating film of each test plate obtained in the above manner were evaluated, and Table 2 shows the results.
Appearance Evaluation For coating film appearance, the lightness in the shade region, specular gloss (60° gloss), graininess, and flip-flop value were evaluated.
Lightness in Shade Region A lightness $L^*110$ in the shade region refers to a lightness $L^*$ in the $L^*a^*b^*$ color space calculated based on a spectral reflectance of light illuminated at an angle of 45 degrees with respect to the coating film and received at an angle of 110 degrees with respect to the specularly reflected light. The values within the range of 60 to 90 are regarded as acceptable.
Specular Gloss (60° Gloss)

The 60° gloss value of the test plates obtained above was measured using a gloss meter (micro-TRI-gloss, produced by BYK-Gardner). The values within the range of 105 or more and 180 or less are regarded as acceptable.
Graininess The graininess is expressed as a hi-light graininess value (hereinafter abbreviated as the "HG value"). The HG value is a parameter of micro-brilliance, which is a texture obtained by microscopic observation, and indicates the graininess in the highlight (when the coating film is observed from near specular reflection with respect to the incident light). The HG value is obtained by taking an image of the coating film at an incident angle of 15° and a receiving angle of 0° using a CCD camera; subjecting the obtained digital image data, i.e., two-dimensional lightness distribution data, to Fourier transformation; extracting only the spatial frequency domain corresponding to graininess from the obtained power spectrum image; and converting the obtained measurement parameter into a numeric value in the range of 0 to 100 in such a manner that the numeric value is directly proportional to the graininess. The numerical values within the range of 10 to 40 are regarded as acceptable.
Flip-Flop Value The flip-flop (FF) value is a numerical value representing a magnitude of a lightness change according to the observation angle. Specifically, a spectral reflectance is measured at receiving angles of 15 and 45 degrees with respect to the specular reflection light of light illuminated at an angle of 45 degrees with respect to the coating film using an MA-68 multi-angle spectrophotometer (trade name, produced by Videojet X-Rite K.K.), and Y values (i.e., Y15 and Y45) in the XYZ color space are calculated based on the measured spectral reflectances. A numerical value calculated using the following formula is defined as the FF value.

Flip-flop value (FF value)=$2\times(Y15-Y45)/(Y15+Y45)$
The numerical values within the range of 1.0 to 1.8 are regarded as acceptable.

The present invention may have the following structures.

Item 1. A multilayer coating film sequentially comprising, on a substrate, a colored coating film, an effect coating film, and a clear coating film.

wherein the multilayer coating film has:
a lightness $L^*110$ within a range of 60 to 90, the lightness $L^*110$ being based on a spectral reflectance of light illuminated at an angle of 45 degrees with respect to the coating surface and received at an angle of 110 degrees with respect to the specularly reflected light;
a 60-degree specular gloss within a range of 105 to 180;
a graininess HG within a range of 10 to 40; and
a flip-flop value within a range of 1.0 to 1.8.

Item 2. The multilayer coating film according to Item 1, wherein the colored coating film is formed by applying a colored coating composition (X) to the substrate, and wherein the colored coating film has a lightness $L^*45$ within a range of 70 to 95, the lightness $L^*45$ being based on a spectral reflectance of light illuminated at an angle of 45 degrees with respect to the coating film and received at an angle of 45 degrees with respect to the specularly reflected light.

Item 3. The multilayer coating film according to Item 1 or 2, wherein the effect coating film is formed by applying an effect pigment dispersion (Y) to the colored coating film, and wherein the effect coating film has a thickness within a range of 0.05 to 2.0 μm as dry film thickness.

Item 4. The multilayer coating film according to any one of Items 1 to 3, wherein the effect pigment dispersion (Y) contains water, a surface modifier (A), a flake-effect pigment (B) having a thickness of 0.01 to 0.2 μm, and a viscosity modifier (C), and wherein the surface modifier (A) has a contact angle of 8 to 20° with respect to a tin plate, the contact angle being measured in such a manner that a liquid that is a mixture of isopropanol, water, and the surface modifier (A) at a weight ratio of 4.5/95/1 is adjusted to have a viscosity of 150 mPa·s measured by a B-type viscometer at a rotor rotational speed of 60 rpm at a temperature of 20° C., 10 μL of the liquid is added dropwise to a previously degreased tin plate produced by Paltek Corporation, and the contact angle with respect to the tin plate is measured 10 seconds after dropping.

Item 5. The multilayer coating film according to any one of Items 1 to 4, wherein the flake-effect pigment (B) is a vapor-deposition aluminum pigment (B-1).

Item 6. The multilayer coating film according to any one of Items 1 to 5, wherein the effect pigment dispersion (Y) further contains a color pigment (D) in an amount of 0.05 to 400 parts by mass, based on 100 parts by mass of the total amount of the flake-effect pigment (B).

Item 7. The multilayer coating film according to any one of Items 1 to 6, wherein the surface modifier (A) is present in an amount of 0.1 to 10 parts by mass, based on 100 parts by mass of the total amount of water, the surface modifier (A), the flake-effect pigment (B), and the viscosity modifier (C).

Item 8. The multilayer coating film according to any one of Items 1 to 6, wherein the surface modifier (A) is present in an amount of 0.2 to 8 parts by mass, based on 100 Parts by mass of the total amount of water, the surface modifier (A), the flake-effect pigment (B), and the viscosity modifier (C).

Item 9. The multilayer coating film according to any one of Items 1 to 6, wherein the surface modifier (A) is present in an amount of 0.4 to 6 parts by mass, based on 100 parts by mass of the total amount of water, the surface modifier (A), the flake-effect pigment (B), and the viscosity modifier (C).

Item 10. The multilayer coating film according to any one of Items 1 to 9, wherein the flake-effect pigment (B) is present in an amount of 0.05 to 3.0 parts by mass, based on 100 parts by mass of the total amount of water, the surface modifier (A), the flake-effect pigment (B), and the viscosity modifier (C).

Item 11: The Multilayer coating film according to any one of Items 1 to 9, wherein the flake-effect pigment (B) is present in an amount of 0.2 to 1.5 parts by mass, based on 100 parts by mass of the total amount of water, the surface modifier (A), the flake-effect pigment (B), and the viscosity modifier (C).

Item 12. The multilayer coating film according to any one of Items 1 to 9, wherein the flake-effect pigment (B) is present in an amount of 0.3 to 0.6 parts by mass, based on 100 parts by mass of the total amount of water, the surface modifier (A), the flake-effect pigment (B), and the viscosity modifier (C).

Item 13. The multilayer coating film according to any one of items 1 to 12, wherein the viscosity modifier (C) is present in an amount of 0.1 to 26 parts by mass, based on 100 parts by mass of the amount of the flake-effect pigment (B).

Item 14. The multilayer coating film according to any one of Items 1 to 12, wherein the viscosity modifier (C) is present in an amount of 0.5 to 10 parts by mass, based on 100 parts by mass of the amount of the flake-effect pigment (B).

Item 15. The multilayer coating film according to any one of Items 1 to 12, wherein the viscosity modifier (C) is present in an amount of 1.0 to 5.0 parts by mass, based on 100 parts by mass of the amount of the flake-effect pigment (B).

Item 16. The multilayer coating film according to any one of Items 6 to 15, wherein the effect pigment dispersion (Y) contains the color pigment (D) in an amount of 100 to 400 parts by mass, based on 100 parts by mass of the total amount of the flake-effect pigment (B).

Item 17. The multilayer coating film according to any one of Items 6 to 16, wherein the color pigment (D) contains a titanium oxide pigment.

Item 18. A method for forming a multilayer coating film, the method comprising applying a colored coating composition (X) to a substrate to form a colored coating film;

applying an effect pigment dispersion (Y) to the uncured colored coating film to form an effect coating film;

applying a clear coating composition (Z) to the uncured effect coating film to form an uncured clear coating film; and heating the uncured colored coating film, the uncured effect coating film, and the uncured clear coating film to simultaneously cure these three coating films, wherein the formed multilayer coating film has:

a lightness L*110 within a range of 60 to 90, the lightness L*110 being based on a spectral reflectance of light illuminated at an angle of 45 degrees with respect to the coating surface and received at an angle of 110 degrees with respect to the specularly reflected light;

a 60-degree specular gloss within a range of 105 to 180;

a graininess HG within a range of 10 to 40; and a flip-flop value within a range of 1.0 to 1.8.

Item 19. The method for forming a multilayer coating film according to Item 7, wherein the clear coating composition (Z) is a two-component clear coating composition containing a hydroxy-containing resin and a polyisocyanate compound.

Item 20. The method for forming a multilayer coating film according to Item 18 or 19, wherein the multilayer coating film is the multilayer coating film of any one of Items 2 to 17.

INDUSTRIAL APPLICABILITY

The multilayer coating film and the method for forming a multilayer coating film according to the present invention can be applied to various industrial products, particularly interior and exterior panels of automobile bodies, and automobile components.

The invention claimed is:

1. A multilayer coating film sequentially comprising, on a substrate, a colored coating film, an effect coating film, and a clear coating film, wherein the effect coating film is obtained from an effect pigment dispersion (Y) containing water in an amount of 70 to 99 parts by mass, a surface modifier (A) in an amount of 0.1 to 10 parts by solids mass, a flake-effect pigment (B) in an amount of 0.05 to 3.0 parts by solids mass and a viscosity modifier (C) in an amount of 0.1 to 26 parts by solids mass, based on 100 parts by mass of the total amount of the water, the surface modifier (A), the flake-effect pigment (B), and the viscosity modifier (C);

wherein a solids content of the effect pigment dispersion (Y) is 0.2 to 3.98 mass %;

wherein the effect coating film has a thickness within a range of 0.05 to 2.0 μm as a dry film thickness; and wherein the multilayer coating film has:

a lightness L*110 within a range of 60 to 90, the lightness L*110 being based on a spectral reflectance of light illuminated at an angle of 45 degrees with respect to the coating surface and received at an angle of 110 degrees with respect to the specularly reflected light;

a 60-degree specular gloss within a range of 105 to 180;

a graininess HG within a range of 10 to 40; and a flip-flop value within a range of 1.0 to 1.8.

2. The multilayer coating film according to claim 1, wherein the colored coating film is formed by applying a colored coating composition (X) to the substrate, and wherein the colored coating film has a lightness L*45 within a range of 70 to 95, the lightness L*45 being based on a spectral reflectance of light illuminated at an angle of 45 degrees with respect to the coating film and received at an angle of 45 degrees with respect to the specularly reflected light.

3. The multilayer coating film according to claim 1, wherein the flake-effect pigment (B) has a thickness of 0.01 to 0.2 μm, and the surface modifier (A) has a contact angle of 8 to 20° with respect to a tin plate, the contact angle being measured in such a manner that a liquid that is a mixture of isopropanol, water, and the surface modifier (A) at a weight ratio of 4.5/95/1 is adjusted to have a viscosity of 150 mPa·s measured by a B-type viscometer at a rotor rotational speed of 60 rpm at a temperature of 20° C., 10 μL of the liquid is added dropwise to a previously degreased tin plate produced by Paltek Corporation, and the contact angle with respect to the tin plate is measured 10 seconds after dropping.

4. The multilayer coating film according to claim 3, wherein the flake-effect pigment (B) is a vapor-deposition aluminum pigment (B-1).

5. The multilayer coating film according to claim 3, wherein the effect pigment dispersion (Y) further contains a color pigment (D) in an amount of 0.05 to 400 parts by mass, based on 100 parts by mass of the total amount of the flake-effect pigment (B).

6. The multilayer coating film according to claim 1, wherein the solids content of the effect pigment dispersion (Y) is 0.2 to 3.3 mass %.

7. A method for forming the multilayer coating film according to claim 1,
the method comprising:
applying a colored coating composition (X) to the substrate to form an uncured colored coating film;
applying the effect pigment dispersion (Y) to the uncured colored coating film to form an uncured effect coating film;
applying a clear coating composition (Z) to the uncured effect coating film to form an uncured clear coating film; and
heating the uncured colored coating film, the uncured effect coating film, and the uncured clear coating film to simultaneously cure these three coating films to obtain the multilayer coating film sequentially comprising, on the substrate, the colored coating film, the effect coating film, and the clear coating film.

8. The method for forming the multilayer coating film according to claim 7, wherein the clear coating composition (Z) is a two-component clear coating composition containing a hydroxy-containing resin and a polyisocyanate compound.

9. The method for forming the multilayer coating film according to claim 7, wherein the solids content of the effect pigment dispersion (Y) is 0.2 to 3.3 mass %.

* * * * *